United States Patent
Aihara et al.

(10) Patent No.: US 9,692,041 B2
(45) Date of Patent: Jun. 27, 2017

(54) LITHIUM BATTERY AND METHOD OF PREPARING CATHODE ACTIVE MATERIAL FOR THE LITHIUM BATTERY

(71) Applicant: Samsung Electronics Co., Ltd., Suwon-si, Gyeonggi-Do (KR)

(72) Inventors: Yuich Aihara, Yokohama (JP); Nobuya Machida, Hyogo (JP); Seitaro Ito, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 62 days.

(21) Appl. No.: 14/503,649

(22) Filed: Oct. 1, 2014

(65) Prior Publication Data
US 2015/0093651 A1    Apr. 2, 2015

(30) Foreign Application Priority Data

Oct. 2, 2013   (JP) .................................. 2013-207298
Sep. 30, 2014  (KR) ......................... 10-2014-0132017

(51) Int. Cl.
| | |
|---|---|
| *H01M 4/62* | (2006.01) |
| *H01M 10/052* | (2010.01) |
| *H01M 4/131* | (2010.01) |
| *H01M 10/0562* | (2010.01) |
| *H01M 4/36* | (2006.01) |

(52) U.S. Cl.
CPC ........... *H01M 4/131* (2013.01); *H01M 4/366* (2013.01); *H01M 4/624* (2013.01); *H01M 10/052* (2013.01); *H01M 10/0562* (2013.01); *H01M 2300/0068* (2013.01); *Y02T 10/7011* (2013.01)

(58) Field of Classification Search
CPC ........... H01M 10/0562; H01M 10/052; H01M 4/131; H01M 4/366; H01M 4/624; H01M 2300/0068; Y02T 10/7011; Y02E 60/122
See application file for complete search history.

(56) References Cited

U.S. PATENT DOCUMENTS

| | | | |
|---|---|---|---|
| 2009/0220856 A1* | 9/2009 | Tian .................... | H01M 4/5825 429/163 |
| 2011/0056824 A1* | 3/2011 | Chung .................. | C23C 14/083 204/192.1 |
| 2012/0214064 A1* | 8/2012 | Sabi .................... | H01M 4/5825 429/211 |
| 2012/0231350 A1* | 9/2012 | Nishida ................. | H01M 4/131 429/322 |
| 2014/0162138 A1* | 6/2014 | Fujiki ............... | H01M 10/0525 429/322 |
| 2015/0024280 A1* | 1/2015 | Uchiyama ............. | H01M 4/505 429/304 |
| 2015/0349339 A1* | 12/2015 | Cho ...................... | H01M 4/366 429/223 |

FOREIGN PATENT DOCUMENTS

| | | |
|---|---|---|
| JP | 2009-193940 A | 8/2009 |
| JP | 2010-272494 A | 12/2010 |
| JP | 2013-089321 A | 5/2013 |
| JP | 5403066 B2 | 11/2013 |
| WO | 2011/065388 A1 | 6/2011 |
| WO | 2011/145462 A1 | 11/2011 |
| WO | 2012/160707 A1 | 11/2012 |

* cited by examiner

*Primary Examiner* — Muhammad Siddiquee
(74) *Attorney, Agent, or Firm* — Cantor Colburn LLP (57) ABSTRACT

A lithium battery and a method of preparing the lithium battery, wherein the lithium battery includes: a cathode layer including a cathode active material including a core, and an ion conductive phosphate coating layer on a surface of the core; an anode layer; and a solid electrolyte layer that is disposed between the cathode layer and the anode layer, wherein the solid electrolyte layer includes a sulfide solid electrolyte.

16 Claims, 2 Drawing Sheets

LITHIUM BATTERY AND METHOD OF PREPARING CATHODE ACTIVE MATERIAL FOR THE LITHIUM BATTERY

RELATED APPLICATION

This application claims priority to and the benefit of Japanese Patent Application No. 2013-207298, filed on Oct. 2, 2013, in the Japanese Intellectual Property Office, and Korean Patent Application No. 10-2014-0132017, filed on Sep. 30, 2014, and all the benefits accruing therefrom under 35 U.S.C. §119, the contents of both of which are incorporated herein in their entirety by reference.

BACKGROUND

1. Field

The present disclosure relates to a lithium battery and a method of preparing a cathode active material for the lithium battery.

2. Description of the Related Art

As a solid electrolyte of a lithium battery, a phosphate-based solid electrolyte or a sulfide-based solid electrolyte may be used. When a lithium battery includes a sulfide-based solid electrolyte, the performance of the lithium battery including the sulfide-based solid electrolyte may deteriorate. Thus there remains a need for a lithium battery including a solid electrolyte having improved performance.

SUMMARY

Provided is a lithium battery including a cathode layer including a cathode active material and a solid electrolyte layer including a sulfide-based solid electrolyte, wherein an increase in resistance in the lithium battery is suppressed, and the battery performance of the lithium battery is improved.

Provided is a method of preparing a cathode active material for the lithium battery, wherein the cathode active material is included in the cathode layer in the lithium battery.

Additional aspects will be set forth in part in the description which follows and, in part, will be apparent from the description.

According to an aspect, a lithium battery includes: a cathode layer including a cathode active material including a core, and an ion conductive phosphate coating layer on a surface of the core; an anode layer; and a solid electrolyte layer that is disposed between the cathode layer and the anode layer, wherein the solid electrolyte layer includes a sulfide solid electrolyte.

According to another aspect, a method of preparing a cathode active material for a lithium battery includes: providing a mixture including a lithium precursor, a metal precursor, a phosphorous oxide, and a solvent; contacting the mixture with a core; heating and stirring the mixture and the core to obtain a cathode active material precursor including a precursor of a coating layer on a surface of the core; and calcining the cathode active material precursor to form an ion conductive phosphate coating layer on the surface of the core.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A lithium battery comprising a sulfide-based solid electrolyte may have excellent stability, cycle characteristics, and rate characteristics. Accordingly, studies have been made to use a sulfide-based solid electrolyte in a lithium battery in order to manufacture a lithium battery with less cycle deterioration.

However, a lithium battery including the sulfide-based solid electrolyte has a resistance generated at an interface between a solid electrolyte layer including the sulfide-based solid electrolyte and a cathode layer, and this resistance is greater than a resistance generated at an interface between an anode layer and the solid electrolyte layer or a resistance of the solid electrolyte layer including the sulfide-based solid electrolyte. While not wanting to be bound by theory, it is understood that this is because a resistant composition is produced at the interface between the cathode active material and the solid electrolyte layer including the sulfide-based solid electrolyte due to reaction occurring at the interface when the lithium battery is charged. Thus, battery performance of the lithium battery including the sulfide-based solid electrolyte may deteriorate upon formation of the resistant composition at the interface of the cathode active material and the solid electrolyte layer.

To solve this problem, a coating layer, such as a coating layer comprising a lithium metal oxide, may be formed on a surface a cathode active material. The cathode active material with a coating layer formed thereon may prevent generation of the resistant composition at the interface by suppressing the reaction with the solid electrolyte layer including the sulfide-based solid electrolyte.

Disclosed is a lithium battery and a method of preparing a cathode active material for the lithium battery, wherein the lithium battery includes a cathode active material comprising a coating layer to improve battery performance as well as to suppress resistance at an interface between the cathode active material and the solid electrolyte layer.

Hereinafter, the lithium battery and the method of preparing a cathode active material for the lithium battery will be disclosed in further detail.

Figure 1:
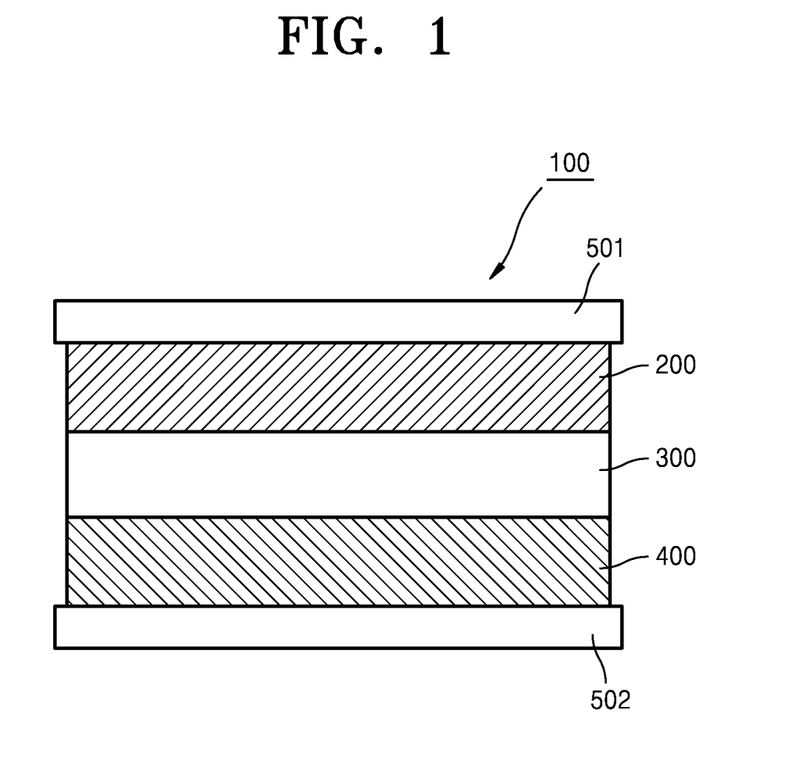
FIG. 1 is a schematic view of an embodiment of a lithium battery.

A lithium battery will be further described by referring to FIG. 1. The lithium battery may be, for example, a lithium ion secondary battery.

FIG. 1 is a schematic view of a lithium battery 100 according to the embodiment. In FIG. 1, 100 denotes a lithium battery, 200 denotes a cathode layer, 300 denotes a solid electrolyte layer, 400 denotes an anode layer, and each of 501 and 502 denotes a current collector.

When the lithium battery 100 is discharged, lithium ions and electrons are emitted from the anode layer 400. The emitted lithium ions reach the cathode layer 200 through a sulfide-based solid electrolyte included in at least one of the cathode layer 200, the anode layer 400, and the solid electrolyte layer 300, and thus a lithium compound is produced in the cathode layer 200. The electrons are provided to the cathode layer 200 via an external circuit that is not shown in FIG. 1. Electrical energy is collected from the external circuit.

When the lithium battery 100 is charged, the lithium compound produced in the cathode layer 200 is oxidized, and thus lithium ions and electrons are generated. The lithium ions reach the anode layer 400 through a sulfide-based solid electrolyte included in each of the cathode layer 200 and the solid electrolyte layer 300. The electrons are provided to the anode layer 400 via an external circuit that is not shown in FIG. 1. Lithium is absorbed into, e.g., intercalated into, the anode layer 400 as the electrons are provided to the lithium ions arrived at the anode layer 400.

Cathode Layer

A lithium battery according to an embodiment includes a cathode layer; an anode layer; and a solid electrolyte layer that is disposed between the cathode layer and the anode layer. The solid electrolyte layer includes a sulfide-based solid electrolyte. Also, the cathode layer includes a cathode active material that includes an ion conductive phosphate-based coating layer on a surface of a core of the cathode.

Figure 2:
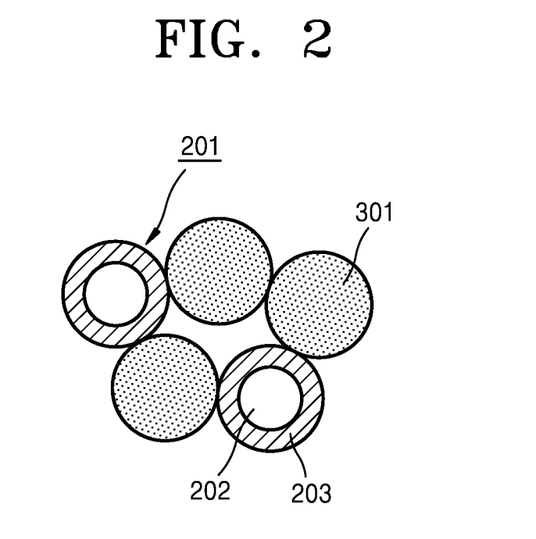
FIG. 2 is a schematic view of an embodiment of a cathode active material comprising a coating layer.

FIG. 2 is a schematic view of a cathode active material comprising a coating layer. In FIG. 2, 201 denotes a cathode active material comprising a coating layer, 202 denotes a core, 203 denotes a coating layer on a surface of the core 202, and 301 denotes a sulfide-based solid electrolyte.

The cathode layer 200 may include a binder and a conducting agent in addition to the cathode active material 201 and the sulfide-based solid electrolyte 301. The cathode layer 200 includes the sulfide-based solid electrolyte 301 to increase a surface where the cathode active material with a coating layer therein 201 and the sulfide-based solid electrolyte 301 contact. In this regard, intercalation and deintercaltion of lithium ions between the cathode active material 201 and the sulfide-based solid electrolyte 301 may be improved.

The cathode active material 201, which comprises the coating layer 203, may be prepared by coating a surface of the core 202 with a coating layer material to form the coating layer 203. Thus, direct contact between the core 202 and the sulfide-based solid electrolyte 301 may be prevented. In this regard, production of a resistant composition due to reaction between the core 202 and the sulfide-based solid electrolyte 301 may be suppressed. When a lithium battery has the coating layer 203, efficiency of intercalation and deintercalation of the lithium battery is not significantly degraded compared to that of a lithium battery having a cathode layer including a core without a coating layer.

The coating layer may comprise an ion conductive phosphate-based coating layer. Examples of the ion conductive phosphate-based coating layer may include a coating layer comprising a lithium metal phosphate, and/or derived from heat treatment of a lithium metal phosphate. For example, the ion conductive phosphate-based coating layer may comprise a lithium metal phosphate including Li, a phosphate group, and at least one metal selected from Sc, Ti, V, Y, Zr, Nb, Ca, Sr, Ba, Hf, Ta, Cr, Mo, and W, or a derivative thereof provided by heat treatment of the lithium metal phosphate.

A type of a coating layer material of the coating layer may be selected in correspondence to a material of the core. For example, the at least one metal selected from Sc, Ti, V, Y, Zr, Nb, Ca, Sr, Ba, Hf, Ta, Cr, Mo, and W may be a metal having an atomic radius that is larger than an atomic radius of a metal or a transition metal of the cathode active material core. When the coating layer includes the metal, the coating layer prevents diffusion of the cathode active material in a crystal structure, and thus a surface of the core may be appropriately coated with the coating layer. For example, the ion conductive phosphate-based coating layer may include at least one selected from $LiZr_2(PO_4)_3$ and $LiTi_2(PO_4)_3$. An embodiment in which the ion conductive phosphate-based coating layer is $LiZr_2(PO_4)_3$ is specifically mentioned.

As used herein, the term "coating layer" refers to a layer disposed on a core of the cathode active material, to provide a surface of the core which is coated, e.g., completely coated, with the coating layer. When the coating layer floats due to contact with the cathode active material core or a sulfide-based solid electrolyte, there may be a small region where the coating layer is not formed on the surface of the cathode active material core. For example, if a difference between an interfacial resistance between a cathode layer, which includes the core and the region where the coating layer is not formed, and a solid electrolyte layer, and an interfacial resistance of a cathode active material with a coating layer formed therein includes a completely coated core is negligible, the presence of the uncoated region may be included.

The ion conductive phosphate-based coating layer may be amorphous or crystalline. In an embodiment in which the ion conductive phosphate-based coating layer may be amorphous. When a lithium battery includes the amorphous ion conductive phosphate-based coating layer, battery performance of the lithium battery may further be improved.

An ion conductivity of the ion conductive phosphate-based coating layer may be, for example, in a range of about $10^{-2}$ S/cm to about $10^{-8}$ S/cm, or, for example, about $10^{-2}$ S/cm to about $10^{-6}$ S/cm. Thus, absorption and absorption, e.g., intercalation and deintercalation, of lithium ions between the cathode active material and the sulfide-based solid electrolyte may be performed through the coating layer at the same efficiency as absorption and absorption, e.g., intercalation and deintercalation, of lithium ions when the coating layer is not used.

The core of the cathode active material including the ion conductive phosphate-based coating layer does not directly contact with the sulfide-based solid electrolyte. In this regard, production of a resistant composition at an interface between the core and the sulfide-based solid electrolyte may be prevented. As the result, interfacial resistance generated at an interface between the cathode layer including the cathode active material including the ion conductive phosphate-based coating layer and the solid electrolyte layer may be suppressed.

A content of the ion conductive phosphate-based coating layer may be in a range of about 0.01 mole percent (mol %) to about 4.0 mol %, based on 100 mol % of the core of the cathode active material. For example, a content of the ion conductive phosphate-based coating layer may be in a range of about 0.1 mol % to about 2.0 mol %, based on 100 mol % of the core. When a content of the ion conductive phosphate-based coating layer is less than 0.01 mol %, an uncoated region on a surface of the core increases, and thus an interfacial resistance may increase. When a content of the ion conductive phosphate-based coating layer is greater than 4.0 mol %, a thickness of the coating layer increases such that a contact surface with the sulfide-based solid electrolyte may be reduced. Thus, when a content of the ion conductive phosphate-based coating layer is within these ranges above, a lithium battery including the ion conductive phosphate-based coating layer may have excellent cycle characteristics as well as an initial discharge capacity.

A thickness of the coating layer on a surface of the core may be even, and as long as the desired effect is provided, a thickness of the coating layer may be uneven. A thickness of the coating layer may be, for example, in a range of about 0.1 nanometers (nm) to about 100 nm, or, for example, about 0.5 nm to about 50 nm. When a thickness of the coating layer on the core is within these ranges, resistance of the coating layer itself may be suppressed.

The core of the cathode active material may comprise any suitable material capable of reversibly intercalating and deintercalating lithium ions. In particular, examples of the cathode active material core include a lithium cobalt oxide, a lithium nickel oxide, a lithium nickel cobalt oxide, a lithium nickel cobalt aluminum oxide, a lithium nickel cobalt manganese oxide, and a lithium iron phosphate.

For example, the core may include a lithium transition metal oxide having a layered rock-salt type structure. The lithium transition metal oxide having a layered rock-salt type structure may have a structure in which a transition metal and lithium are regularly arranged in a 111 direction of a cubic rock-salt type structure to form a 2-dimensional flat surface. In the structure, the transition metal may be irregularly arranged in a lithium layer, and the lithium in a transition metal layer. When the irregularity of the arrangement is small, charging/discharging characteristics of the lithium battery including the cathode active material may be excellent.

The core may include at least one a lithium metal oxide selected from $LiCoO_2$ and Formula 1:

$$Li_{(1-x-y-z)}Ni_xCo_yM_zO_2 \qquad \text{Formula 1}$$

In Formula 1, M may be Al or Mn, and 0<x<1, 0<y<1, 0<z<1, and x+y+z<1.

Examples of the lithium metal oxide represented by Formula 1 may include at least one selected from $LiNi_{1/3}Co_{1/3}Mn_{1/3}O_2$, $LiNi_{0.8}Co_{0.1}Mn_{0.1}O_2$, and $LiNi_{0.8}Co_{0.15}Al_{0.05}O_2$. When a lithium battery includes the lithium metal oxide represented by Formula 1, the lithium battery may have improved energy density or thermal stability at charging/discharging the battery compared to when a lithium battery includes a lithium cobalt oxide.

A particle diameter of the cathode active material may be in a range of about 0.1 μm to about 20 μm, or, for example, about 1 μm to about 10 μm. When a particle diameter of the cathode active material is within these ranges, a specific surface area of the cathode active material may be suitable.

The core of the cathode active material may contact with the sulfide-based solid electrolyte when the core is coated with a coating layer material. Since a thickness of the coating layer may be in a range of about 1 nm to about 50 nm, a specific surface area of the cathode active material with a coating layer formed therein is almost the same as a specific surface area of the cathode active material before being coated with the coating layer. In this regard, since a contact surface between the cathode active material with a coating layer formed therein and the sulfide-based solid electrolyte is large, a large pathway for intercalation and deintercalation of lithium ions may be provided. Thus, lithium ion conductivity of the lithium battery including the cathode active material may be improved.

Moreover, in order to efficiently transfer lithium ions between the solid electrolyte layer and the cathode layer, a surface at which the cathode active material contacts the sulfide-based solid electrolyte through the coating layer may be large in the cathode layer. In this regard, a weight ratio of the cathode active material with a coating layer formed therein to the sulfide-based solid electrolyte may be in a range of about 80:20 to about 40:60 in the cathode layer, based on a total weight of the cathode active material and the sulfide-based solid electrolyte. When a mixing ratio of the cathode active material with a coating layer formed therein and the sulfide-based solid electrolyte is within this range, a transfer efficiency of the lithium ions may improve. The ratio of the cathode active material with a coating layer formed therein to the sulfide-based solid electrolyte may be determined in consideration of a composition of the cathode active material with a coating layer formed therein and the solid electrolyte, an average particle diameter, or a conducting agent.

Also, the cathode layer may appropriately include a conducting agent, a binder, a filler, or a dispersing agent, each of which may be determined by one of skill in the art. Examples of the conducting agent include at least one selected from graphite, carbon black, acetylene black, Ketjen black, carbon fiber, and a metal powder. Examples of the binder include at least one selected from polytetrafluoroethylene, polyvinylidene fluoride, and polyethylene.

Solid Electrolyte Layer

A solid electrolyte layer may include the sulfide-based solid electrolyte and may appropriately include other suitable materials such as a binder or a conducting agent. For example, the solid electrolyte layer may include a binder or a conducting agent that is used in the cathode layer.

The sulfide-based solid electrolyte may include $Li_2S$ and $P_2S_5$. A mole ratio of $Li_2S$ and $P_2S_5$ may be, for example, in a range of about 60:40 to about 80:20, or for example, about 70:30 to about 80:20, based on a total number of moles of the $Li_2S$ and $P_2S_5$. When a mixing ratio of $Li_2S$ and $P_2S_5$ is within these ranges, a solid electrolyte layer including a sulfide-based solid electrolyte with excellent ion conductivity may be obtained. In order to increase ion conductivity, a large content of $Li_2S$ in the mixture is preferable, but when a content of $Li_2S$ is too much, unreacted $Li_2S$ may be remained. Also, when a content of $Li_2S$ is too small, sufficient ion conductivity for the use of a lithium battery may not be obtained. In addition to $Li_2S$ and $P_2S_5$, the sulfide-based solid electrolyte may include $SiS_2$, $GeS_2$, or $B_2S_3$ to improve ion conductivity of a lithium battery.

An ion conductivity of the sulfide-based solid electrolyte may be in a range of about $10^{-4}$ Siemens per centimeter (S/cm) to about $10^{-2}$ S/cm, or, for example, about $10^{-3}$ S/cm to about $10^{-2}$ S/cm. When an ion conductivity of the sulfide-based solid electrolyte is lower than $10^{-4}$ S/cm, a charging/discharging capacity of the lithium battery including the sulfide-based solid electrolyte may be significantly deteriorated. For example, an ion conductivity of may be in a range of about $10^{-2}$ S/cm to about $10^{-4}$ S/cm.

Examples of the sulfide-based solid electrolyte include $Li_3PS_4$ and $Li_4P_2S_7$. The sulfide-based solid electrolyte may be amorphous, crystalline, glass phase, or glass-ceramic phase, and the sulfide-based solid electrolyte may be amorphous as an amorphous sulfide-based solid electrolyte tends to have a high ion conductivity.

A method of combining the $Li_2S$ and $P_2S_5$ is not particularly limited, and a mechanical milling (an "MM" method) may be used to mix $Li_2S$ and $P_2S_5$. The mechanical milling may be performed using a ball mill.

Anode Layer

An anode layer may include an anode active material and the sulfide-based solid electrolyte. Also, the anode layer may appropriately include other materials such as a conducting agent in addition to the anode active material or the sulfide-based solid electrolyte.

An anode active material used in an exemplary embodiment may be a material capable of intercalation and deintercalation of lithium ions. In particular, examples of the anode active material may include a metal such as at least one selected from lithium, indium, tin, aluminum, and silicon, alloys thereof, and a transition metal oxide such as $Li_{4/3}Ti_{5/3}O_4$ or SnO. Also, a carbon material such as graphite may form an intercalation compound with lithium ions between layers. The anode active material may be used alone or together with another material.

In the anode layer, a weight ratio of the anode active material to the sulfide-based solid electrolyte may be about 60:40 to provide a sufficient contact area for the anode active material and the sulfide-based solid electrolyte. In this regard, an anode layer with excellent lithium ion conductivity may be formed. However, a content of the sulfide-based solid electrolyte in the mixture may be less than 40 weight percent as long as the technical effect of the present embodiment is provided.

Preparation of Lithium Battery

A cathode layer is prepared using a cathode mixture including a cathode active material including an ion conductive phosphate-based coating layer on a surface of a core of the cathode active material; and an anode layer is prepared using an anode mixture; and each of the cathode layer and the anode layer are stacked with a sulfide-based solid electrolyte layer disposed therebetween, and thus a lithium battery is prepared.

Preparation Process of Sulfide-Based Solid Electrolyte

A sulfide-based solid electrolyte may be prepared using a solution quenching method or a mechanical milling method. When the mechanical milling method is used, $Li_2S$ and $P_2S_5$ may be intensely stirred and mixed using a ball mill to obtain a sulfide-based solid electrolyte having a selected particle diameter. When the mechanical milling method is used, thermal decomposition of the raw material composition may be avoided, and thus a sulfide-based solid electrolyte may be easily obtained.

A mole ratio of $Li_2S$ and $P_2S_5$ may be, for example, in a range of about 60:40 to about 80:20, or, for example, about 70:30 to about 80:20, based on total moles of the $Li_2S$ and $P_2S_5$. When the raw materials are mixed within these ranges, an increase in a content of unreacted $Li_2S$ may be suppressed, and a sulfide-based solid electrolyte with a high ion conductivity may be prepared.

When the solution quenching method is used, $Li_2S$ and $P_2S_5$ may be pelletized at a selected mole ratio of $Li_2S$ and $P_2S_5$, for example, in a range of about 60:40 to about 80:20, or, for example, about 70:30 to about 80:20, based on a total number of moles of the $Li_2S$ and $P_2S_5$. A pellet of $Li_2S$ and $P_2S_5$ may be heat-treated in vacuum and then rapidly cooled to obtain a sulfide-based solid electrolyte. A heat treating temperature may be, for example, in a range of about 400° C. to about 1000° C., for example, about 800° C. to about 900° C. A reaction time may be, for example, about 0.1 hour to about 12 hours, or, for example, about 1 hour to about 12 hours. A quenching temperature may be, for example, about 10° C. or lower, or, for example, about 0° C. or lower. A quenching velocity may be, for example, in a range of about 1 Kelvin per second (K/sec) to about 10000 K/sec, or, for example, about 1 K/sec to about 1000 K/sec.

Preparation Process of Cathode Mixture

A cathode mixture may be prepared by directly mixing the cathode active material with a coating layer formed therein and the sulfide-based solid electrolyte using a mortar or by mixing the cathode active material with a coating layer formed therein and the sulfide-based solid electrolyte in a solution. The cathode mixture may include other compositions such as a binder or a conducting agent.

A weight ratio of the cathode active material with a coating layer formed therein and the sulfide-based solid electrolyte may be in a range of about 70:30 to about 40:60, or, for example, about 60:40, based on a total weight of the cathode active material and the sulfide-based solid electrolyte. When a weight ratio of the cathode active material with a coating layer formed therein and the sulfide-based solid electrolyte is within this range, a contact area of the coating layer of the cathode active material and the sulfide-based solid electrolyte may be provided, and sufficient intercalation and deintercalation of lithium ions may occur so that the lithium battery may have a desired charging/discharging capacity.

When the cathode mixture is prepared using a direct mixing method, powders of the cathode active material with a coating layer formed therein and the sulfide-based solid electrolyte are placed in a mortar at a mixing ratio within the range above, and then, a powder of each of a binder and a conducting material may be added thereto. Then, the mixture may be mixed until all components contained in the mortar are homogeneously mixed, and thus the cathode mixture may be prepared. The cathode mixture thus obtained may be pelletized and used in a stacking process, which is further described below. When the cathode mixture is prepared using a solvent, examples of the solvent of the cathode mixture may include at least one selected from N-methyl-2-pyrrolidone ("NMP"), N,N-dimethylacetamide, and N,N-dimethylformamide.

About 40 parts to about 70 part by weight of the cathode active material comprising the coating layer, about 30 parts to about 60 parts by weight of the sulfide-based solid electrolyte, about 1 part to about 10 parts by weight of the conducting agent, and about 1 part to about 5 parts by weight of the binder, based on 100 parts by weight of the cathode mixture are placed in a mortar and stirred until all components contained in the mortar are homogeneously mixed, and thus a slurry is prepared. A dispersing agent or a viscosity agent may be appropriately added to the slurry. A current collector may be coated with the cathode mixture thus obtained and dried to form a cathode layer. In order to suppress electric resistance in the cathode layer, a thickness of the cathode layer may be in a range of about 10 μm to about 200 μm, or, for example, about 10 μm to about 200 μm. The current collector may be formed of a material conventionally known in the art. In particular, examples of the material for the current collector may include indium, copper, magnesium, stainless steel, titanium, iron, cobalt, nickel, zinc, aluminum, germanium, lithium, or alloys thereof. The material for the current collector may be molded into a plate-type structure or a film-type structure having a thickness of about 0.1 μm to about 100 μm.

A method of coating the current collector with the cathode mixture may be a die coating method or a doctor blade method. The cathode mixture coated on the current collector may be prepared by removing the solvent through heat-treatment. A temperature for the heat-treatment may be, for example, in a range of about 80° C. to about 200° C., or, for example, about 80° C. to about 120° C. A period of time for the heat-treatment may be, for example, in a range of about 30 minutes to about 120 minutes. After the heat-treatment, the cathode mixture may be vacuum-dried to completely remove the solvent, thereby preparing a cathode layer. The vacuum-dry may be performed at a temperature of, for example, in a range of about 80° C. to about 200° C., or, for example, about 80° C. to about 120° C. A thickness of the cathode layer after the drying may be, for example, in a range of about 10 μm to about 100 μm.

Method of Preparing Cathode Active Material for Lithium Battery

A method of preparing a cathode active material for a lithium battery includes mixing a core of the cathode active material, and a lithium precursor, a metal precursor, and a coating layer material of a phosphorous oxide in a solvent to obtain a mixture, heating and stirring the mixture to obtain a cathode active material precursor having a precursor of the coating layer material impregnated on a surface of the core to impregnate the precursor of the coating layer material on the surface of the core, and calcining the cathode active material precursor to form an ion conductive phosphate-based coating layer on the surface of the core in a calcining process.

Mixing Process

A core, and a coating layer material comprising a lithium precursor, a metal precursor, and a phosphorous oxide are mixed in a solvent to obtain a mixture.

The coating layer material is a starting material which may be obtained by homogenously mixing a lithium alkoxide, which is the lithium precursor, a metal alkoxide, which is the metal precursor, and a phosphorous oxide in the solvent to prepare a gel solution, and then mixing the core with the gel solution. The lithium alkoxide may be a lithium C1 to C8 alkoxide. The metal alkoxide may be a metal C1 to C8 alkoxide.

The core of the cathode active material may include a lithium metal oxide represented by $LiCoO_2$ or Formula 1:

$$Li_{(1-x-y-z)}Ni_xCo_yM_zO_2 \qquad \text{Formula 1}$$

In Formula 1, M may be Al or Mn; and $0<x<1$, $0<y<1$, $0<z<1$, and $x+y+z<1$.

The metal precursor may include an alkoxide of at least one metal selected from Sc, Ti, V, Y, Zr, Nb, Ca, Sr, Ba, Hf, Ta, Cr, Mo, and W. The metal precursor may be, for example, a zirconium propoxide. The alkoxide may be a C1 to C8 alkoxide.

The solvent may include at least one selected from water, alcohol, and ethylacetate. The solvent may be, for example, a mixture of a water and alcohol. In this regard, a compatibility with a solute may be improved. Examples of the alcohol include isopropanol, ethanol, and methanol. A content of water may be added to about 1 mol % to about 6 mol %, with respect to the total content of the alcohol.

The lithium alkoxide, phosphorous oxide, and a metal alkoxide may be included in the gel solution to the amounts each corresponding to a desired composition ratio in the coating layer material. A composition ratio of the raw materials included in the gel solution and a composition ratio of a coating layer obtained by undergoing the process for impregnating a precursor of the coating layer material on a surface of the core and the calcining process are almost the same. Therefore, a coating layer having a desired composition ratio may be obtained by selecting contents of the additives when preparing the gel solution. An ion conductivity of the coating layer may be in a range of about $10^{-2}$ S/cm to about $10^{-8}$ S/cm, or, for example, about $10^{-2}$ S/cm to about $10^{-6}$ S/cm. According to dispersion state of the solute, a speed of forming the gel may be controlled by adding ethylacetate.

The core weighted to a selected content was added to the gel solution, and the gel solution was stirred until the cathode active material is homogenously dispersed, and thus a cathode active material solution, which allows the coating layer to be formed on the core, is obtained. A content of the core may be selected so that a content of the coating layer is in a range of about 0.01 mol % to about 4.0 mol %, or, for example, about 0.01 mol % to about 2.0 mol %, based on 100 mol % of the core in the gel solution. When a content of the coating layer is more than 4.0 mol %, electric resistance may increase due to the thick the coating layer. When a content of the coating layer is less than 0.01 mol %, characteristics of the coating layer of the cathode active material may be insufficient, and thus a resistant composition may be generated when the cathode active material and the solid electrolyte directly contact each other. A dispersing agent known in the art may be further added to the gel solution.

Process for Impregnating a Precursor of the Coating Layer Material on a Surface of the Core The mixture is heated and stirred to obtain a cathode active material precursor having a precursor of the coating layer material impregnated on a surface of the core. In particular, the cathode active material solution obtained from the mixing process is heated and stirred, and thus the mixture is dried by evaporating the solvent.

A temperature for the drying is a temperature at which the solvent may be evaporated which may be in a range of about 40° C. to about 100° C., or, for example, about 40° C. to about 60° C.

The heating and stirring may be performed to remove the solvent while irradiating ultrasonic waves to the cathode active material solution. In this regard, fine particulates existing in the cathode active material solution in a gel phase may be aggregated, and the solvent may be removed while dispersing the obtained aggregate. As a result, a cathode active material precursor having a precursor of the coating layer material impregnated on a surface of the cathode active material at an even thickness may be obtained. If a material having an impregnated precursor of the cathode active material with an even thickness may be obtained, other methods, such as a drying method of spraying a coating solution to the core may be used.

Calcining Process

The residual solvent that is not removed by the solvent removing process above may be removed by the calcining process, and the cathode active material precursor having a precursor of the coating layer material impregnated on a surface of the cathode active material surface may be calcined to form an ion conductive phosphate-based coating layer on the core.

The cathode active material precursor may be calcined in an oxygen atmosphere or in the air at a temperature in a range of about 300° C. to about 750° C. For example, the cathode active material precursor may be calcined in an oxygen atmosphere or in the air at a temperature in a range of about 300° C. to about 400° C.

A temperature of the calcining process may be, for example, in a range of about 300° C. to about 750° C., for example, about 350° C. to about 500° C., or, for example, about 350° C. to about 400° C. When a temperature of the calcining process is within a range of about 350° C. to about 500° C., an amorphous ion conductive phosphate-based cathode active material with a coating layer formed therein may be obtained. A thickness of the coating layer may be, for example, in a range of about 0.1 nm to about 100 nm, or, for example, about 0.5 nm to about 20 nm. When a temperature of the calcining process is off the ranges above, battery characteristics may deteriorate. A period of time for the calcining process may be, for example, in a range of about 60 minutes to about 120 minutes, or, for example, about 40 minutes to about 80 minutes.

The calcining process may be performed in an oxygen atmosphere. In this case, a charging/discharging capacity of the lithium battery may be maintained by suppressing reduction of a metal or a transition metal included in the cathode active material solution.

Preparation Process of Anode Mixture

An anode mixture may be prepared by directly mixing the anode active material and the sulfide-based solid electrolyte using a mortar or by mixing the anode active material and the sulfide-based solid electrolyte in a solution. Examples of the solvent include N-methyl-2-pyrrolidone ("NMP"), N,N-dimethylacetatamide, and N,N-dimethylformamide. Also, an organic solvent or a viscosity agent may be included in the anode mixture in addition to the solvent. In this regard, when a current collector is coated with an anode mixture material including the anode active material and the sulfide-based solid electrolyte, an anode mixture with an easy handling property may be obtained. A binder or a conducting agent may be appropriately added to the anode mixture.

When the anode mixture is prepared using a direct mixing method, powders of the anode active material and the sulfide-based solid electrolyte may be placed in a mortar at a mixing ratio within the range above, and then, a powder of each of a binder and a conducting material is added thereto. Then, the mixture may be mixed until all components contained in the mortar are homogeneously mixed, and thus the anode mixture may be prepared. The anode mixture thus obtained may be pelletized and used in a stacking process, which will be described later. When the anode mixture is prepared using a solvent, a current collector may be coated with the anode mixture using a die coating method or a doctor blade method, and dried to form an anode layer. A thickness of the anode layer may be in a range of about, about 0.1 μm to about 100 μm, or, for example, about 1 μm to about 50 μm. The current collector may be the same current collector used in the formation of the cathode layer.

The anode mixture on the current collector may be prepared by removing the solvent through heat-treatment. A temperature for the heat-treatment may be, for example, in a range of about 80° C. to about 200° C., and a period of time for the heat-treatment may be, for example, in a range of about 30 minutes to about 120 minutes. After the heat-treatment, the anode mixture may be vacuum-dried to completely remove the solvent, thereby preparing an anode layer. The vacuum-dry may be performed at a temperature of, for example, in a range of about 80° C. to about 200° C., or, for example, about 100° C. to about 120° C. A thickness of the anode layer after the drying may be, for example, in a range of about 10 μm to about 100 μm.

Stacking Process

A lithium battery, for example, a lithium ion secondary battery, may be prepared by first stacking the anode layer and the cathode layer on the current collectors, disposing the anode layer-stacked current collector and the cathode layer-stacked current collector to face each other on inner walls of a cell container. Then, the sulfide-based solid electrolyte fills a space between the anode layer and the cathode layer, thereby forming a stack including a current collector, an anode layer, a sulfide-based solid electrolyte layer, a cathode layer, and a current collector that are stacked in the listed order. The stack may be pressed at a selected pressure, and thus a lithium ion secondary battery may be obtained. A shape of the cell container is not particularly limited, and a cylinder type of the cell container may be used. A thickness of the stack after the pressing may include a thickness of the anode layer, for example, in a range of about 0.1 μm to about 50 μm, a thickness of the sulfide-based solid electrolyte layer, for example, in a range of about 1 μm to about 200 μm, and a thickness of the cathode layer, for example, in a range of about 1 μm to about 200 μm.

Alternatively, the anode mixture of a pellet type is stacked at a thickness in a range of about 0.1 μm to about 100 μm on an inner wall of the cell container. The sulfide-based solid electrolyte may be stacked on the stacked anode mixture layer at a thickness in a range of about 10 μm to about 100 μm. The cathode mixture of a pellet type is stacked on the stacked sulfide-based solid electrolyte at a thickness in a range of about 0.1 μm to about 100 μm. The obtained stack may be pressed at a pressure in a range of about 3 tons/cm$^2$ to about 6 tons/cm$^2$, and thus a stack structure of the lithium ion secondary battery may be formed.

The lithium ion secondary battery includes the cathode active material including the ion conductive phosphate-based coating layer formed on the cathode active material core, and thus generation of a resistance composition caused by reaction between the cathode active material and the sulfide-based solid electrolyte may be prevented. In this regard, an interfacial resistance between the cathode active material and the sulfide-based solid electrolyte is suppressed, and thus the lithium ion secondary battery may have an excellent charging/discharging capacity and excellent cycle characteristics. The lithium ion secondary battery may be used in a portable information device or an electrical vehicle.

The present disclosure will be described in further detail with reference to the following examples. These examples are for illustrative purposes only and are not intended to limit the scope of the present disclosure.

EXAMPLES

Preparation of Lithium Battery

Example 1

Li$_2$S and P$_2$S$_5$ (at a mole ratio of 80:20) were mixed using a mechanical milling method (an "MM" method) to obtain a sulfide-based solid electrolyte. Here, an average particle diameter of the sulfide-based solid electrolyte was 10 μm.

As starting raw materials of a coating layer material, 0.4 g of a 1 molar (M) solution of lithium methoxide in methanol, 0.34 g of zirconium (IV) propoxide, and 0.11 g of phosphorous oxide (P$_2$O$_5$) were prepared, and the starting raw materials were mixed in a mixture solvent including isopropanol, ethylacetate, and water for 30 minutes to obtain a mixture solution. 5 g of LiNi$_{0.8}$Co$_{0.15}$Al$_{0.05}$O$_2$ (hereinafter, also referred to as "NCA") as a core of the cathode active material was added to the mixture solution to obtain a mixture. The mixture thus obtained was heated and stirred at a temperature of 40° C. to evaporate the solvent and dry the mixture. The drying may be performed by irradiating ultrasonic waves to the mixture, and thus a cathode active material precursor having a precursor of LiZr$_2$(PO$_4$)$_3$ impregnated on a surface of the cathode active material NCA core. Then, the cathode active material precursor was calcined in an oxygen atmosphere at a temperature of 350° C. for 1 hour to obtain a cathode active material with a coating layer formed therein having 1.0 mol % LiZr$_2$(PO$_4$)$_3$ on a surface of the cathode active material NCA core. Here, an average particle diameter of the cathode active material with the LiZr$_2$(PO$_4$)$_3$ coating layer formed therein was 10 μm.

The cathode active material with the LiZr$_2$(PO$_4$)$_3$ coating layer formed therein, the sulfide-based solid electrolyte, and a carbon material, as a conducting agent, were mixed at a weight ratio of 60:35:5 using a mortar until the mixture was homogenous, and the mixture was pelletized using a hand press to obtain a cathode mixture.

Graphite with an average particle diameter of 10 μm, as an anode active material, the sulfide-based solid electrolyte, and a carbon material, as a conducting agent, were mixed at a weight ratio of 60:35:5 using a mortar until the mixture was homogenous, and the mixture was pelletized using a hand press to obtain an anode mixture.

The pelletized cathode mixture and anode mixture were each stacked on a stainless current collector, and thus a cathode layer and an anode layer were respectively prepared.

Subsequently, the anode layer was disposed on an inner wall of a cell container. 70 milligrams (mg) of the sulfide-based solid electrolyte was stacked on the anode layer, and a surface of the sulfide-based solid electrolyte was lightly evened using a molding device. Then, the amorphous cathode layer including the cathode active material with the LiZr$_2$(PO$_4$)$_3$ coating layer formed therein was stacked on the sulfide-based solid electrolyte. The stack structure was pressed with a pressure of 3 tons/cm$^2$, and thus a lithium battery was prepared.

Example 2

A lithium battery was prepared in the same manner as in Example 1, except that a titanium (IV) propoxide was used instead of a zirconium (IV) propoxide among the starting raw materials of the coating layer material.

Comparative Example 1

A lithium battery was prepared in the same manner as in Example 1, except that an NCA core, as a cathode active material on which a coating layer is not formed, was used instead of the cathode active material with the LiZr$_2$(PO$_4$)$_3$ coating layer formed therein.

Comparative Example 2

A lithium battery was prepared in the same manner as in Example 1, except that 0.4 g of a 1 M solution of lithium methoxide in methanol and 0.34 g of zirconium (IV) propoxide were used instead of 0.4 g of a 1 M solution of lithium methoxide in methanol, 0.34 g of zirconium (IV) propoxide, and 0.11 g of phosphorous oxide ($P_2O_5$) among the starting raw materials of the coating layer material.

Evaluation of Battery Performance

Evaluation Example 1

The lithium batteries prepared in Example 1, Example 2, and Comparative Example 1 were charged at a temperature of 25° C. with a constant current of 0.05 C until an upper-limit voltage of 4.0 V, impedances of the lithium batteries at a charged state were measured, and the lithium batteries were discharged with a constant current of 0.05 C until a final discharge voltage of 2.5 V to measure initial discharge capacities of the lithium batteries. In the same manner, the lithium batteries were charged with a constant current of 0.05 C and discharged with a constant current of 1 C. The 1 C discharge capacity was divided by the 0.05 C discharge capacity to measure rate characteristics, and thus battery performance was evaluated. The results are shown in Table 1.

TABLE 1

| | Initial discharge capacity ($mAhg^{-1}$) | Impedance (ohms) | Rate characteristic (1 C/0.05 C) |
|---|---|---|---|
| Example 1 (including a $LiZr_2(PO_4)_3$ coating layer) | 102 | 74 | 0.52 |
| Example 2 (including a $LiTi_2(PO_4)_3$ coating layer) | 96 | 130 | 0.47 |
| Comparative Example 1 (a coating layer is not formed) | 93 | 660 | 0.23 |

Referring to Table 1, initial discharge capacities and rate characteristics of the lithium batteries prepared in Examples 1 and 2 were higher than those of the lithium battery prepared in Comparative Example 1, and impedances of the lithium batteries prepared in Examples 1 and 2 were lower than that of the lithium battery prepared in Comparative Example 1. Thus, it may be confirmed that battery performance of the lithium batteries prepared in Examples 1 and 2 were better than that of the lithium battery prepared in Comparative Example 1.

Also, the lithium batteries prepared in Example 1 and Comparative Example 2 were charged at a temperature of 25° C. with a constant current of 0.05 C until an upper-limit voltage of 4.0 V, and the lithium batteries were discharged with a constant current of 0.05 C until a final discharge voltage of 2.5 V to measure initial discharge capacities of the lithium batteries. Then, discharge capacities of the lithium batteries upto $10^{th}$ cycles were measured to evaluate a capacity retention rate. The capacity retention rate was calculated by dividing an initial discharge capacity with a discharge capacity at the $10^{th}$ cycle. The results are shown in Table 2 and FIG. 3.

TABLE 2

| | Capacity retention rate |
|---|---|
| Example 1 | 0.996 |
| Comparative Example 2 | 0.991 |

Figure 3:
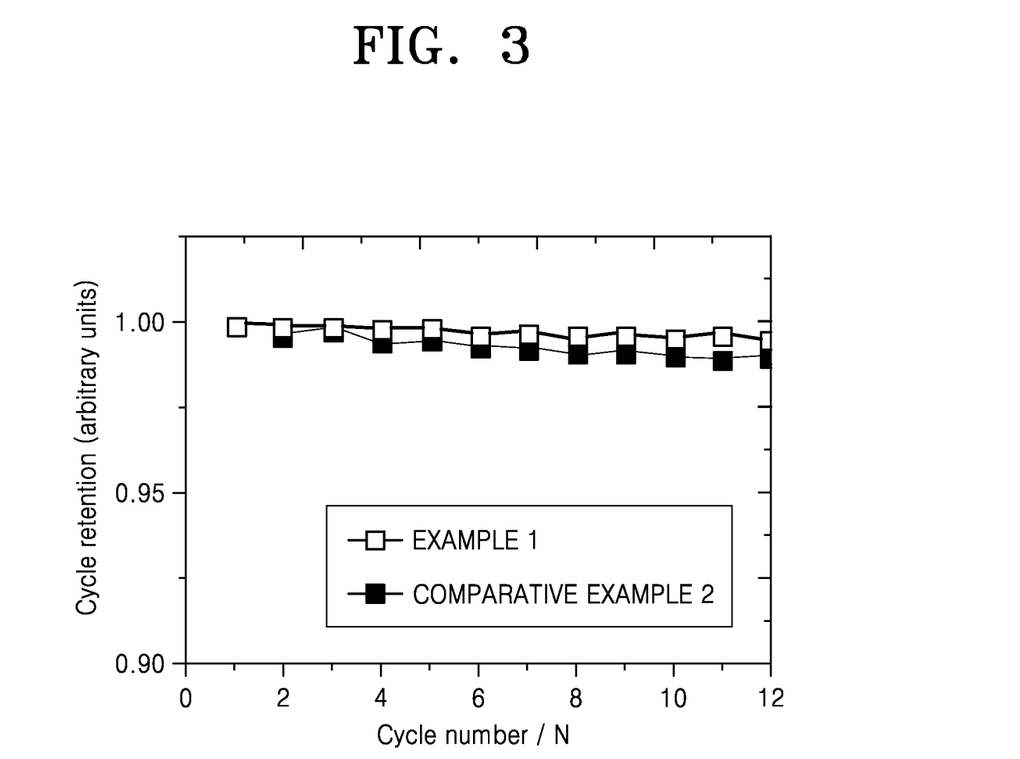
FIG. 3 is a graph of cycle retention (arbitrary units) versus cycle number illustrating life characteristics of lithium batteries prepared in Example 1 and Comparative Example 2.

Referring to Table 2 and FIG. 3, a capacity retention rate of the lithium battery prepared in Example 1 was higher than that of the lithium battery prepared in Comparative Example 2. Thus, it may be known that battery performance of the lithium battery prepared Example 1 is better than that of the lithium battery prepared in Comparative Example 2.

As described above, according to an embodiment, interfacial resistance may be suppressed by preventing generation of a resistant composition between a solid electrolyte layer including a sulfide-based solid electrolyte and a cathode layer including cathode active material including an ion conductive phosphate-based coating layer on a surface of a core of the cathode active material. A lithium battery including the solid electrolyte layer and the cathode layer may have excellent battery performance such as an excellent discharge capacity, excellent rate characteristics, and excellent cycle characteristics.

It should be understood that the exemplary embodiments described therein should be considered in a descriptive sense only and not for purposes of limitation. Descriptions of features, advantages, or aspects within each embodiment shall be considered as available for other similar features, advantages or aspects in other embodiments.

While one or more embodiments have been described with reference to the figures, it will be understood by those of ordinary skill in the art that various changes in form and details may be made therein without departing from the spirit and scope of the present invention as defined by the following claims.

What is claimed is:

1. A lithium battery comprising:
   a cathode layer comprising a cathode active material comprising
      a core, and
      an ion conductive phosphate coating layer directly on an entire surface of the core;
   an anode layer; and
   a solid electrolyte layer that is disposed between the cathode layer and the anode layer,
   wherein the solid electrolyte layer comprises a sulfide solid electrolyte, and
   wherein the ion conductive phosphate coating layer comprises a lithium metal phosphate,
   wherein the ion conductive phosphate coating layer comprises at least one metal selected from $LiZr_2(PO_4)_3$ and $LiTi_2(PO_4)_3$, and
   wherein a content of the ion conductive phosphate coating layer is within a range of about 0.01 mole percent to about 4 mole percent, based on 100 mole percent of the core.

2. The lithium battery of claim 1, wherein an ion conductivity of the ion conductive phosphate coating layer is in a range of about $10^{-2}$ Siemens per centimeter to about $10^{-8}$ Siemens per centimeter.

3. The lithium battery of claim 1, wherein the ion conductive phosphate coating layer is amorphous.

4. The lithium battery of claim 1, wherein the core of the cathode active material comprises a lithium transition metal oxide having a layered rock-salt type structure.

5. The lithium battery of claim 4, wherein the core comprises a lithium transition metal oxide represented by $LiCoO_2$ or Formula 1:

$$Li_{(1-x-y-z)}Ni_xCo_yM_zO_2 \qquad \text{Formula 1}$$

wherein, in Formula 1,
M is Al or Mn; and
0<x<1, 0<y<1, 0<z<1, and x+y+z<1.

6. The lithium battery of claim 1, wherein the sulfide solid electrolyte comprises $Li_2S$ and $P_2S_5$.

7. The lithium battery of claim 1, wherein an ion conductivity of the sulfide solid electrolyte is in a range of at least about $10^{-4}$ Siemens per centimeter to about $10^{-2}$ Siemens per centimeter.

8. A method of preparing a cathode active material for a lithium battery, the method comprising:
providing a mixture comprising a lithium precursor, a metal precursor, a phosphorous oxide, and a solvent;
contacting the mixture with a core;
heating and stirring the mixture and the core to obtain a cathode active material precursor comprising a precursor of a coating layer on a surface of the core; and
calcining the cathode active material precursor to form an ion conductive phosphate coating layer directly on an entire surface of the core, and
wherein the ion conductive phosphate coating layer comprises a lithium metal phosphate,
wherein the ion conductive phosphate coating layer comprises at least one metal selected from $LiZr_2(PO_4)_3$ and $LiTi_2(PO_4)_3$, and
wherein a content of the ion conductive phosphate coating layer is within a range of about 0.01 mole percent to about 4 mole percent, based on 100 mole percent of the core.

9. The method of claim 8, wherein the core comprises at least one lithium metal oxide selected from $LiCoO_2$ and Formula 1:

Formula 1 wherein, in Formula 1,
M is Al or Mn; and
$0<x<1$, $0<y<1$, $0<z<1$, and $x+y+z<1$.

10. The method of claim 8, wherein the metal precursor comprises an alkoxide of at least one metal selected from Sc, Ti, V, Y, Zr, Nb, Ca, Sr, Ba, Hf, Ta, Cr, Mo, and W.

11. The method of claim 8, wherein the metal precursor comprises at least one selected from a zirconium (IV) propoxide and a titanium (IV) propoxide.

12. The method of claim 8, wherein the solvent comprises at least one selected from water, alcohol, and ethylacetate.

13. The method of claim 8, wherein the heating and stirring of the mixture and the core to obtain the cathode active material precursor having the precursor of the coating layer on a surface of the core comprises removing the solvent by irradiating with ultrasonic waves.

14. The method of claim 8, wherein the calcining of the cathode active material precursor to form an ion conductive phosphate coating layer on the surface of the core comprises calcining the cathode active material precursor in an oxygen atmosphere or in air at a temperature of about 300° C. to about 750° C.

15. The method of claim 8, wherein the calcining of the cathode active material precursor to form an ion conductive phosphate coating layer on the surface of the core comprises calcining the cathode active material precursor in an oxygen atmosphere or in air at a temperature of about 300° C. to about 400° C.

16. The method of claim 8, wherein the ion conductive phosphate coating layer is amorphous.

* * * * *